US005434370A

United States Patent [19]
Wilson et al.

[11] Patent Number: 5,434,370
[45] Date of Patent: Jul. 18, 1995

[54] MARKING SYSTEM WITH PEN-UP/PEN-DOWN TRACKING

[75] Inventors: Scott E. Wilson, Sherwood; Samuel W. Mallicoat, Portland; Donald H. Zurstadt, Sherwood, all of Oreg.

[73] Assignee: Microfield Graphics, Inc., Beaverton, Oreg.

[21] Appl. No.: 148,837

[22] Filed: Nov. 5, 1993

[51] Int. Cl.⁶ ............................................. G08C 21/00
[52] U.S. Cl. ........................................... 178/18; 345/179
[58] Field of Search .......................... 178/18, 19, 70; 345/156, 173, 174, 175, 179; 341/20, 31; 250/221

[56] References Cited
U.S. PATENT DOCUMENTS

| Re. 33,936 | 5/1992 | Miyamori et al. |
|---|---|---|
| 3,184,847 | 5/1965 | Rosen . |
| 3,457,646 | 7/1969 | Schwemin . |
| 3,543,240 | 11/1970 | Miller et al. |
| 3,553,680 | 1/1971 | Cooreman . |
| 3,609,237 | 9/1971 | Gerber . |
| 3,613,066 | 10/1971 | Cooreman . |
| 3,709,602 | 1/1973 | Satomi . |
| 3,733,979 | 5/1973 | England . |
| 3,752,558 | 8/1973 | Lloyd . |
| 3,775,560 | 11/1973 | Ebeling et al. |
| 3,783,445 | 1/1974 | Penwarden . |
| 3,818,133 | 6/1974 | Cotter . |
| 3,873,770 | 3/1975 | Ioannou . |
| 3,898,445 | 8/1975 | MacLeod et al. |
| 3,944,740 | 3/1976 | Murase et al. |
| 4,078,151 | 3/1978 | McNeary et al. |
| 4,104,617 | 8/1978 | Bean et al. |
| 4,125,743 | 11/1978 | O'Boyle et al. |
| 4,181,952 | 1/1980 | Casey et al. |
| 4,198,623 | 4/1980 | Misek et al. |
| 4,205,304 | 5/1980 | Moore . |
| 4,206,314 | 6/1980 | Prugh et al. |
| 4,213,005 | 7/1980 | Cameron . |
| 4,227,044 | 10/1980 | Fencl . |
| 4,237,617 | 12/1980 | Goussios . |
| 4,277,783 | 7/1981 | Sampieri et al. |

(List continued on next page.)

FOREIGN PATENT DOCUMENTS
1575420 9/1980 United Kingdom .

OTHER PUBLICATIONS

Optical Devices: Lasers; National Aeronautics and Space Administration.

Polyvision; manufactured by Polytronix, Inc.

Pinpointing Coordinates with Laser Beam Scanning; Position feedback opens up applications from the classroom to the surgical suite; by Gerald F. Marshall, Jagmohan S. Gadhok and John L. Junkins.

Electronic Blackboard Technology; Manufactured by Digital Scanning Systems.

(List continued on next page.)

Primary Examiner—Stephen Chin
Assistant Examiner—Paul Loomis
Attorney, Agent, or Firm—Kolisch Hartwell Dickinson McCormack & Heuser

[57] ABSTRACT

A system and method for detecting movement of an object along an axis normal to a planar surface is described. The invention is applied to a graphic data-acquisition system in which a digitized record is produced according to the X, Y and Z location of a writing implement relative to a writing surface. An expanse of electromagnetic radiation is generated in a zone closely adjacent to the writing surface. An electromagnetic-interactive structure is associated with the writing implement at a location where it will interact with the expanse when the pen is in a write mode. The configuration of the radiation-interactive structure and its positioning relative to the expanse allows the production of an analog data stream which may be correlated to relative distance between the tip of the pen and the writing surface. After fine analog data is digitized, a processing routine is used to determine reliably and accurately when the pen has moved to the non-write mode. The processor is configured to perform the desired discriminatory function with minimal occurrences of false positives relating to pen tilting, writing velocity and board irregularity.

13 Claims, 2 Drawing Sheets

U.S. PATENT DOCUMENTS

| | | |
|---|---|---|
| 4,294,543 | 10/1981 | Apple et al. . |
| 4,317,956 | 3/1982 | Torok et al. . |
| 4,318,096 | 3/1982 | Thornburg et al. . |
| 4,342,910 | 8/1982 | Pfeifer et al. . |
| 4,345,313 | 8/1982 | Knox . |
| 4,380,076 | 4/1983 | Bethune . |
| 4,386,346 | 5/1983 | Levine . |
| 4,501,931 | 2/1985 | Ohya et al. . |
| 4,504,910 | 3/1985 | Araki et al. . |
| 4,553,842 | 11/1985 | Griffin . |
| 4,558,313 | 12/1985 | Garwin et al. . |
| 4,568,182 | 2/1986 | Modjallal . |
| 4,642,422 | 2/1987 | Garwin et al. . |
| 4,670,751 | 6/1987 | Enokido et al. . |
| 4,688,900 | 8/1987 | Doane et al. . |
| 4,711,977 | 12/1987 | Miyamori et al. . |
| 4,772,763 | 9/1988 | Garwin et al. . |
| 4,777,329 | 10/1988 | Mallicoat . |
| 4,786,891 | 11/1988 | Ueda et al. . |
| 4,812,833 | 3/1989 | Shimauchi ............................ 345/175 |
| 4,812,940 | 3/1989 | Takenaga . |
| 4,832,144 | 5/1989 | Murakami et al. . |
| 4,901,073 | 2/1990 | Kibrick . |
| 4,938,570 | 7/1990 | Majima et al. . |
| 4,944,576 | 7/1990 | Lacker et al. . |
| 4,994,204 | 2/1991 | Doane et al. . |
| 4,998,105 | 3/1991 | Takekoshi et al. . |
| 5,009,044 | 4/1991 | Baughman et al. . |
| 5,015,057 | 5/1991 | Rumbaugh et al. . |
| 5,023,408 | 6/1991 | Murakami et al. . |
| 5,073,954 | 12/1991 | Van Tyne et al. . |
| 5,076,690 | 12/1991 | de Vos et al. . |
| 5,096,282 | 3/1992 | Margerum et al. . |
| 5,103,080 | 4/1992 | Barkan . |
| 5,121,449 | 6/1992 | Shiba et al. . |
| 5,130,795 | 7/1992 | Rusche et al. . |
| 5,137,354 | 8/1992 | de Vos et al. . |
| 5,196,835 | 3/1993 | Blue et al. ............................ 345/175 |

MARKING SYSTEM WITH PEN-UP/PEN-DOWN TRACKING

FIELD OF THE INVENTION

The invention relates to a system and method for tracking the location of an object relative to a substantially planar surface. In particular, the invention involves the production of a quantitative data stream correlating to the relative distance between the object and the surface, and has been applied for the purpose of determining whether a writing implement is in a write mode or a non-write mode relative to a writing surface.

BACKGROUND OF THE INVENTION

In the past 20 to 30 years, a number of systems for tracking and digitizing the X, Y location of a writing implement relative to a writing surface have been disclosed. For example, a summary of the work in this field is discussed in the background section of U.S. Pat. No. 5,248,856, the entire patent of which is hereby incorporated by reference.

In the system disclosed in the '856 patent, a reflective code structure is provided around the circumference of a pen toward the writing tip. Two scanning laser beams are used to monitor continuously the X, Y location of the reflective structure by triangulation.

A principal problem with the system disclosed in the '856 patent and other prior systems is that the X, Y location of the writing implement may be tracked and digitized even when the operator has moved the pen away from the board between writing events. This causes an incongruity between what the writer actually writes, or intends to write, and the image which is reproducible from the digitized record.

Several types of writing interruption events may occur during a writing or drawing session. A first type of interruption event occurs when the operator of the implement completely removes the pen out of the range of X, Y scanner detection. This type of interruption event is relatively easy to determine because when it occurs there is an absence of interaction between the implement and the scanners. Even if the system does not have a mechanism for concluding that absence of interaction between the implement and the scanners indicates movement of the pen to a non-writing mode, it does not matter because when the pen is not interacting with the scanners, there can be no X, Y tracking.

The present invention, however, addresses a second type of writing interruption event which most commonly occurs, for example, when the operator is printing letters. When moving a pen between printed letters, the operator typically lifts the pen only a small distance, for example, a fraction of an inch, above the writing surface. During this type of writing interruption event, the implement generally continues to interact with the X, Y scanning system causing unwanted lines, commonly referred to as "tracers," in the digitally reproduced image.

Tracers are especially problematic when the system is used to track the writing of a series of discrete symbols for which the meaning may be lost or changed when the symbols are connected by tracers. For example, Chinese characters, such as the one shown in FIG. 7, may completely lose or alter its meaning when the components of the symbol or adjacent symbols are connected by tracers.

Accordingly, an important objective of the present invention is to provide a system for quantitatively tracking movement of an object along an axis perpendicular to a planar surface.

More particularly, an objective of the invention is to provide a system and method for determining whether a writing implement is in a write mode or a non-write mode relative to a writing surface.

Another object of the invention is to provide a system which is capable of discriminating between board-contacted and board-non-contacted movement of a writing implement.

Another object of the invention is to distinguish between a write mode and a non-write mode of a writing implement with minimal if any occurrence of false detection due to pen tilting, fluctuation in pen velocity or other writing style idiosyncracies.

Another object of the invention is to provide pen-up/pen-down detection without interfering with the effective simultaneous detection of coding information on the pen for indicating the character, for example, color, of the pen.

SUMMARY OF THE INVENTION

The objects stated above are accomplished by the present invention which may be used generally to track the location of an object along an axis normal to a planar surface. In the present case, the invention is applied as a sub-system in the context of a graphic data-acquisition system for tracking the position of a writing implement relative to a writing surface. The sub-system is used to distinguish between a write mode and a non-write mode of the writing implement.

In the sub-system, an electromagnetic-radiation-generating structure is located adjacent to the writing surface. The structure is operable to produce an expanse of radiation in a substantially planar zone near the writing surface. A radiation-interactive structure is associated with the implement. For example, the radiation-interactive structure is preferably mounted around a circumferential outer surface of the implement. The radiation-interactive structure is capable of interacting with the expanse to effect the production of an analog data stream which can be correlated to the relative distance between a writing tip on the implement and the writing surface. The analog data stream, resulting from the interaction between the radiation interactive structure and the expanse of radiation, is transmitted to a processor where the information is interpreted so that determinations can be made as to the writing or non-writing status of the implement.

In a preferred embodiment of the invention, the electromagnetic-radiation generating structure generates a scanning laser beam. The radiation-interactive structure is reflective. In one approach the scanning beam and implement reflector are positioned so that when the implement is in the writing mode, the reflector partially penetrates the zone of the scanning laser beam. When the pen tip is moved away from the writing surface, the degree of reflector penetration into the scanning zone changes quantitatively resulting in the production of an interpretable analog data stream.

In a second approach, the depth of the scanning beam may be quite thin. The reflector has a reflective gradient in the direction of the axis of the pen (which is ideally perpendicular to the writing surface, hereafter referred to as the "Z axis"). In the second approach, the laser scanning zone and the implement reflector may be positioned so that the reflector completely crosses the zone. As the implement writing tip is moved along the Z axis, the quantity of light reflected from the reflector varies infinitely and is used to determine the movement of the implement between the writing mode and the non-writing mode.

In a related method of the invention, a sub-system, as discussed above, is used to generate an analog data stream correlating to the movement of the pen tip along the Z axis. A processor is used to interpret the data stream and ultimately discriminate between writing and non-writing activity. A preferred processing scheme involves, first, the establishing of a base line amplitude in a moving window of time while the implement is in the write mode. Second, an amplitude threshold is set a fixed magnitude away from the base line. Third, the occurrence of a non-write or "pen-up" event is determined when the analog amplitude moves outside the area between the threshold and base line. Finally, once it has been determined that the pen has moved to a non-write mode, that non-write designation is extended back toward the point where the movement of the implement away from the writing surface was first detected.

DESCRIPTION OF THE DRAWINGS

FIG. 4 is a graphic plot of the analog data amplitude which is recorded during the writing of the words shown in FIGS. 5 and 6. FIG. 4 also illustrates the threshold cut-off that was used to produce the images shown in FIGS. 5 and 6.

DETAILED DESCRIPTION OF THE PREFERRED EMBODIMENT

The present invention provides a mechanism for tracking movement of an implement along the Z axis normal to a planar surface. The system is particularly useful in the context of a data-acquisition system such as the one disclosed in the '856 patent referred to above.

The subject of the present invention is also related to the subject matters disclosed and claimed in three other U.S. patent applications, namely: the invention of Donald H. Zurstadt, Samuel W. Mallicoat and Scott E. Wilson, entitled "CALIBRATION OF GRAPHIC DATA-ACQUISITION TRACKING SYSTEM", filed on Nov. 5, 1993, the invention of Guy L. Williams, Timothy A. Jenness and Scott E. Wilson, entitled "OPTICAL-SCANNING SYSTEM EMPLOYING LASER AND LASER SAFETY CONTROL", filed on Nov. 5, 1993; and the invention of Timothy A. Jenness and Scott E. Wilson, entitled "GRAPHIC DATA-ACQUISITION SYSTEM UTILIZING LIGHT-SOURCE STRUCTURE WITH EXTRANEOUS-LIGHT FILTERING", filed on Nov. 5, 1993, each of which is hereby incorporated by reference.

Figure 1:
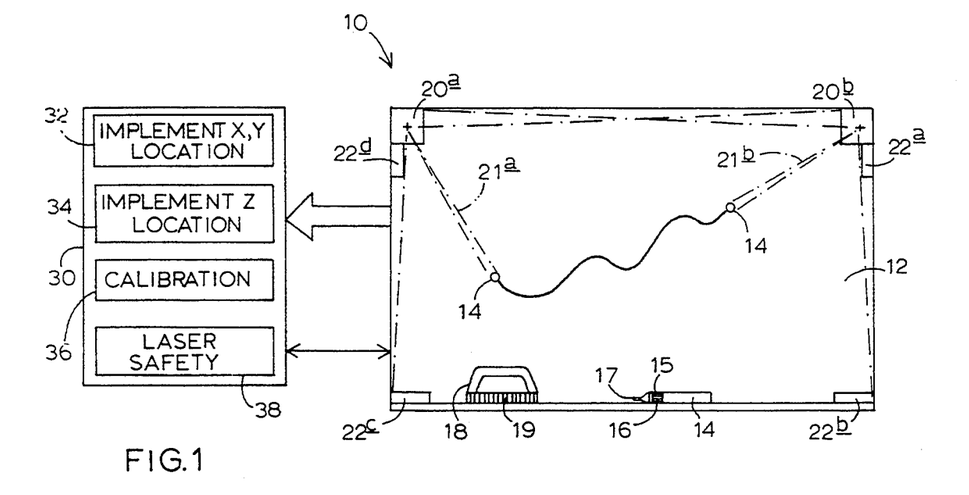
FIG. 1 is a front view of a graphic data-acquisition system of the present invention.

FIG. 1 shows basic components of the present invention incorporated into an electromagnetic-field-responsive graphic data-acquisition systems 10 as disclosed in the '856 patent with modifications directed to implement Z location, calibration and laser safety. The graphic data-acquisition system 10 includes a writing surface 12 and a writing implement 14. The implement has a reflector structure 15 with code structure 16 for indicating characteristics of the implement, for example, color, tip width, etc. The reflector 15 is typically mounted circumferentially around a side of the implement 14 toward the writing tip 17. An eraser 18 is also provided with an eraser signaling code structure 19.

Laser scanners 20a and 20b are mounted adjacent the writing surface near the upper left and upper right hand corners respectively of the writing surface. In the preferred embodiment, the scanning lasers 20a and 20b each generate an expanse of electromagnetic radiation in a substantially planar zone near the writing surface 12. However, the invention could be analogously employed by using a static or non-scanning electromagnetic-radiation-generating structure. Laser scanners 20a and 20b generate scanning laser beams 21a and 21b respectively which preferably alternate through scanning cycles across the writing surface 12. Although not critical, in the preferred embodiment, beam 21a scans in a counterclockwise motion and beam 21b scans in a clockwise motion.

A variety of different types of radiation may be used to produce the expanse. For example, the expanse in the preferred embodiment is derived from a scanned, invisible laser beam. However, visible or infrared light could also be used.

Calibration strips 22a, 22b, 22c and 22d are positioned near the corners of the writing surface for interacting with the laser beams for the purposes of providing reference points from which to track X, Y movement of the implement 14, and to provide information regarding the position of the radiation expanse(s) relative to the writing surface.

Light reflection monitoring structures (not shown) are positioned adjacent the writing surface for receiving light reflected from the implement reflector 15, the laser 18, and the calibration strips 22a, 22b, 22c and 22d. The reflectance information signal is then transmitted to the processor 30 where, in the preferred embodiment, it undergoes analog-to-digital conversion and interpretation. Processor 30 can also be designed to interpret the analog data without digital conversion. One portion of the processing structure 32 determines implement X, Y location based on data received from both scanners 20a and 20b and a triangulation calculation. Another portion of the processor 34 assesses the implement Z location for the purpose of discriminating between pen-up/pen-down events. A third portion of the processor 30 interprets information resulting from the interaction of 21a and 21b with calibration strips 22a, 22b, 22c and 22d for the primary purpose of monitoring the position of the scanning laser beams relative to the writing surface. A fourth portion of the processor 38 interprets information relating to the function of the scanning laser, and is capable of instructing the system to shut down when the scanner is not functioning properly.

Figure 2:
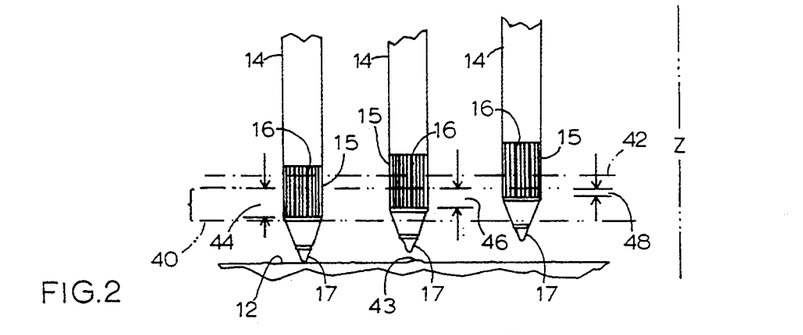
FIG. 2 is a partial side view of a writing implement with reflector structure showing varying interaction between the reflector and the radiation expanse as the pen tip moves away from the writing surface.
Figure 3:
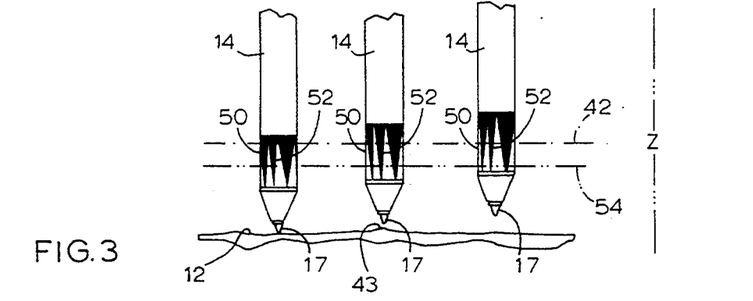
FIG. 3 is a partial side view of a writing implement with reflector showing another way of effecting variable interaction between the reflector and the radiation expanse as the writing tip moves away from the writing surface.

FIGS. 2 and 3 focus on structural components of the invention which allow the generation of an analog signal correlating to movement of the writing implement 14 along the Z axis. Persons skilled in the art will readily recognize that the structures shown in FIGS. 2 and 3 are just two examples of many possible alternatives for producing the desired data, all of which are claimed below.

In FIG. 2, the pen 14 is shown in three positions in time progression going from left to right. The pen 14 starts out in the "write mode" with tip 17 contacting the writing surface 12. In this position, the reflector 15 interacts with both laser beams produced by scanners 20a and 20b. The scanner 20a produces a relatively thin beam 42, approximately 0.8 to 2.0 millimeters in thickness. Aside from providing information for X, Y location of the pen, laser beam 42 functions to effect production of data based on the bar code structure 15 which can be interpreted to provide character information about the pen. The other expanse of radiation 40 which is produced by the scanning laser beam 21b, is relatively thicker than radiation expanse 42. Radiation expanse 40 is preferably between approximately 4.0 and 5.0 millimeters. The center of beam 40 is preferably located approximately 0.30 inches from the highest point 43 on the writing surface 12. The center of beam 42 is preferably located approximately 0.42 inches away from the highest point 43 on the writing surface.

It can be seen in FIG. 2 that when the tip 17 is contacting the writing surface 12, reflector 15 penetrates beam 40 by a distance in the Z direction designated at 44. In the second pen position illustrated, as the tip 17 moves away from writing surface 12 in the Z direction, the distance 46 or degree of penetration of reflector 15 into beam 40 decreases causing a corresponding change in the magnitude of reflective light. Finally, in the third pen position illustrated, tip 17 has continued to move further from the writing surface 12 in the Z direction, causing the distance 48 by which reflector 15 penetrates into the zone occupied by scanning beam 40, to further decrease. Thus, it is apparent that a reflective signal based on the degree of reflector penetration into laser beam 40 provides an infinitely varying signal directly correlating to the distance between tip 17 and writing surface 12.

FIG. 3 shows another way of effecting the production of an analog signal which correlates to movement of the pen tip in the Z direction. In this example, the reflector 50 is variably reflective in the Z direction. This is accomplished by tapering the bar code structure 52 in such a way that no matter which part of the reflector interacts with beam 42, the bar code information which indicates pen character, will be accurately read. With regard to beam 54 which is responsible for perfecting the production of information relating to location of the pen in the Z direction, the amount of light reflected by reflector 50 will depend on which part of the reflector is interacting with beam 54.

In the first pen position shown in FIG. 3, tip 17 contacts writing surface 12. In this position the amount of light originating from beam 54 which reflects from reflector 50 is less than the magnitudes of light reflected in the two subsequently illustrated pen positions. As pen tip 17 moves away from writing surface 12 the amount of reflectable area on the reflector 50 intersecting beam 54 increases causing a corresponding increase in analog amplitude.

A variety of other mechanisms, employing modifications or combinations of the principals just illustrated, can be employed for the purpose of making possible the interaction between a structure on the pen and an electromagnetic radiation expanse having a defined relationship to the writing surface, so that the desired quantitative data stream can be generated. For instance, a modification of the reflector shown in FIG. 2 would employ a reflective gray scale gradient in the C direction. Such a reflector could be used in conjunction with a relatively thin beam such as 54 shown in FIG. 3. Once an analog data stream correlating to the Z location of the pen is generated, processor portion 34 determines when the pen is moved to a non-writing mode. Theoretically, in the ideal case where the operator always writes with the pen absolutely perpendicular to the writing surface, at a constant speed and on a perfectly flat writing surface, the determination of whether the pen is moved to a non-write mode would be relatively simple. When the pen has stayed at one level long enough, a baseline amplitude is set. When the amplitude changes a certain amount from the baseline, non-write status of the implement is indicated.

However, in the real world, the writing surface is not flat. The operator does not write with uniform velocity and frequently tips the pen in various directions away from its ideal perpendicular orientation. These real world variables are individually and collectively potential sources of false positives, meaning that the process will indicate that the pen is not writing when in fact it is writing or vice versa.

For example, assume that an operator is writing with the pen substantially tipped causing a greater degree of reflector penetration into the radiation expanse than would exist if the pen were perpendicular to the writing surface. All of a sudden, while continuing to write, the operator adjusts the orientation of the pen to be substantially perpendicular to the writing surface causing a corresponding decrease in the magnitude of reflection. A processor could potentially conclude that the pen has moved to a non-write mode when in fact the pen is still writing, however, in a different angular orientation with respect to the writing surface. Another example which could produce false positives would be where there is a relatively large irregularity in the topography of the writing surface. If the pen tip rises over a bump on the board, the degree of interaction between a reflector in the radiation expanse will change creating the possibility that the processor will falsely determine that the pen has moved to a non-write mode.

Consequently, a detailed processing routine has been developed based on a great deal of empirical experimentation. The objective is to develop a processing structure which will be capable of discriminating between potential false positive events which are not in fact due to a real change in the writing status of the implement, while reliably and accurately determining movement of the implement into the non-write mode.

Figure 4:
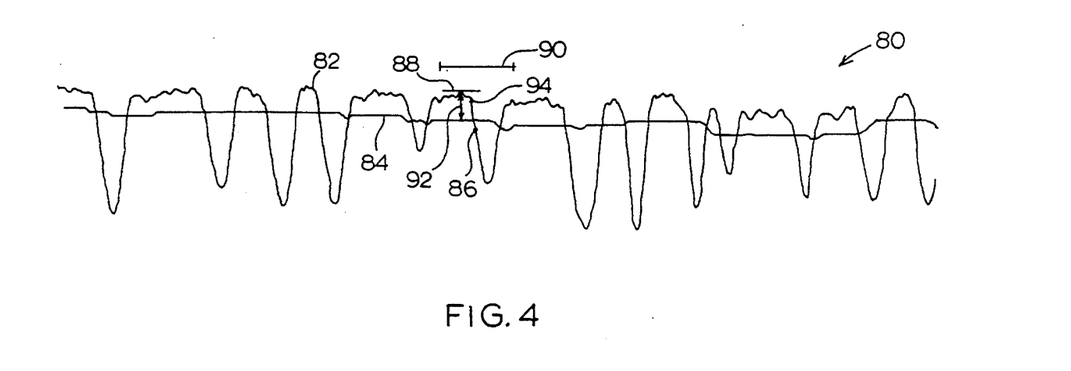

FIG. 4 shows an actual analog plot 80 with data stream 82. Threshold 84 is continuously set relative to a baseline amplitude established while the implement is in write mode. For a given point 86 along the analog data stream 82 a baseline 88 is set in accordance with the maximum amplitude taken from a set of readings during a selected window of time 90 spanning the time just before and the time just after the generation of point 86. The threshold 84 is then set a preselected magnitude 92 below baseline 88. If point 86 falls outside the area between baseline 88 and threshold 84, it is determined that the pen has moved to a non-write mode. Once that determination has been made, the digitized record will indicate that the pen stopped writing at point 94 which is closer toward the point where the pen-up movement began.

The following code routine is used in a preferred process structure to discriminate between writing and non-writing activity with a minimal occurrence of false positives due to variations in writing speed, style and board irregularities.

```c
/*                          PUD_FILT.C                          */
/* The purpose of this module is primarily to determine if the pen is in a up
or down state.

Note in this source file the word PUD is an acronym for pen up down
 */
#include "all.h"
#define BUFF_SIZE 7      /* The Size to make the main buffer */
#define BUFF_CENTER 3    /* The index that points to the center point of the
                             buffer */ define FILTER_SIZE 3    /* The size of the Filter Buffer */

/* If is not defined elsewhere define the pen up threshold */
#ifndef PEN_UP_THRESHOLD
#define PEN_UP_THRESHOLD 30    #endif
void DoPud(void);
void ShiftBuffer(void);

/*   We Buffer the pen data as it come in from the scanner portion of the
     software (getxy.c). The buffer is made up of XBuff[], YBuff[], AmpBuff[]
     and ColorBuff[]. The Amplitude data is an indication of how much light is
     being returned from the pen to the right scanner. The closer the pen is
     to the board the higher the amplitude will be. The data comes in by
     repeated calls to BufferHandler. BufferHandler takes care of filling
     itself and calling the pen up down portion of the code (DoPud()). If the
     pen has been off the board for a long enough time the buffer can be
     flushed with a call to FlushBuffer().

FilterBuff[] is used to do a moving average filter of the amplitudes data
     to help reduce the noise in the data.

BuffState keeps track of state of the Buffer. BuffStartUp is the State
     the buffer is in when it has no data in it. When the first data point
     come in the first half of the buffer is filled with this data. The buffer
     state then switches to Filling. In this state we are filling the rest of
     the buffer as data comes in. When the buffer if full we switch to Norm
     state. In this state as each new sample comes in we shift the data in the
     buffer by one. The new sample it put in the end of the buffer and the
     oldest data is lost off the end. For each sample in this mode
     BufferHandler make to call to DoPud(). DoPud() uses the data in the
     buffer to decide if the pen is in an up or down state.

It is the job of the ProtocolHandler to translate the data points into a
     stream of RS232 data that is send to the host. HandlePenUp is part of the
     protocol handler module.
     */

/* BuffState is the State that the Buffer if in   */
static enum{
            BuffStartUp,
            Filling,
            Norm,
            } BuffState = BuffStartUp;

/* PudState is the state that the pen is in.   */
static enum{
            PenDown,
            PenUp,
            LookingForMin
            } PudState = PenUp;
```

```c
/* These next four arrays make up the main buffer */
int XBuff[BUFF_SIZE];
int YBuff[BUFF_SIZE];
int AmpBuff[BUFF_SIZE];
int ColorBuff[BUFF_SIZE];

/* This array is used to filter the amplitude data to reduce noise */
int FilterBuff[FILTER_SIZE];

int BuffEnd = 0;
int FilterSum;
int FilterIndex; /* The index into the FilterBuff */
int BuffIndex;   /* One index into the main Buffer */

/*---------------------------------------------------------------*/
/*                          InitPud                              */
/*---------------------------------------------------------------*/
/* A call to InitPud sets the states for the buffer and the pen. */
void InitPud(void)
{
      BuffState = BuffStartUp;
      PudState = PenDown;
}

/*---------------------------------------------------------------*/
/*                       BufferHandler                           */
/*---------------------------------------------------------------*/
/* This is the main routine that gets called in this routine.    */
/* See above for a general description of its operation          */
void BufferHandler(int x, int y, int color, int Amp)
{
      int i;
      switch(BuffState)
      {
            case BuffStartUp:

/* Start the Amplitude filter by filling its buffer with */
                  /*   the first  amplitude value                          */
                  FilterSum = 0;
                  for(i = 0; i != FILTER_SIZE; i++)
                  {
                        FilterBuff[i] = Amp;
                  }
                  FilterSum = Amp * FILTER_SIZE;

/* Fill the back half of the buffer with the data from  */
                  /* the first point.                                      */
                  for(BuffIndex = 0; BuffIndex != BUFF_CENTER + 2; BuffIndex++)
                  {
                        XBuff[BuffIndex] = x;
                        YBuff[BuffIndex] = y;
                        AmpBuff[BuffIndex] = FilterSum;
                        ColorBuff[BuffIndex] = color;
                  }
                        FilterIndex = 0;
                        BuffState = Filling;
                        break;

case Filling:
                  /* First filter the Amplitude data */
                  FilterSum += Amp - FilterBuff[FilterIndex];
                  FilterBuff[FilterIndex] = Amp;
                  FilterIndex++;
                  if(FilterIndex == FILTER_SIZE)
                        FilterIndex =0;

/* Next add the data to the buffer */
                  XBuff[BuffIndex] = x;
                  YBuff[BuffIndex] = y;
                  ColorBuff[BuffIndex] = color;
                  AmpBuff[BuffIndex] = FilterSum;
                  BuffIndex++;
```

```
                    /* If the Buffer is full switch to Normal mode for the*/
                    /* buffer.                                             */
                    if(BuffIndex == BUFF_SIZE)
                            BuffState = Norm;
                    break;

case Norm:
                    /* First filter the Amplitude data */
                    FilterSum += Amp - FilterBuff[FilterIndex];
                    FilterBuff[FilterIndex] = Amp;
                    FilterIndex++;
                    if(FilterIndex == FILTER_SIZE)
                            FilterIndex =0;

/* Shift all the Data in the buffer down by one.          */
          ShiftBuffer();
          /* Add the data to the end of the buffer.                 */
          AmpBuff[BUFF_SIZE - 1] = FilterSum;
          XBuff[BUFF_SIZE - 1] = x;
          YBuff[BUFF_SIZE - 1] = y;
          ColorBuff[BUFF_SIZE - 1] = color;
          /* Call DoPud to handle the data point at the center of   */
          /* the filter.                                            */
          DoPud();
          break;

}
}

/*----------------------------------------------------------------------------*/
/*                          ShiftBuffer                                       */
/*----------------------------------------------------------------------------*/
/* Shift data in the buffer down by one.                                      */
/* If the Buffer ever gets much bigger then what it is we may what to         */
/* implement this in assembly code for better speed.                          */
void ShiftBuffer(void)
{
     int i;
     int j;
     for(i = 0; i != BUFF_SIZE - 1; i++)
     {
          j = i + 1;
          AmpBuff[i] = AmpBuff[j];
          XBuff[i] = XBuff[j];
          YBuff[i] = YBuff[j];
          ColorBuff[i] = ColorBuff[j];
     }
}

/*----------------------------------------------------------------------------*/
/*                          FlushPudBuffer                                    */
/*----------------------------------------------------------------------------*/
/*    Flushes the buffer by sending whatever data is in the buffer            */
/*    to DoPud().                                                             */
void FlushPudBuffer(void)
{
     int i;
     int Amp;
     /* If the buffer is not full, pad the Amplitude data with the last       */
     /* amplitude data we got.                                                */
     Amp = AmpBuff[i - 1];
     for(i = BuffIndex; i < BUFF_SIZE; i++)
          AmpBuff[i] = Amp;

/* Shift the data that is in the buffer one at a time to the
     /* center of the buffer and call DoPud() to handle it.
     for(i = BUFF_CENTER; i < BuffIndex - 1 ; i++)
     {
          ShiftBuffer();
          AmpBuff[BUFF_SIZE - 1] = Amp;
          DoPud();
```

```
        }
        /* If the Pen is down at the end of flushing bring it up by       */
        /* calling HandlePenUp().                                         */
        if(BuffState == PenDown)
                HandlePenUp();
}

/*----------------------------------------------------------------------*/
/*                              DoPud                                   */
/*----------------------------------------------------------------------*/
/* If the pen is in the up state we are checking to see if it should    */
/* be down. If the pen is in the down state we are checking to see if   */
/* it should be up. When we determine that the pen should be in the     */
/* up state because of a falling ampulate we wait for the minimum in    */
/* the amplitude before looking for the pen to go to the pen down       */
/* state. The point under test is the point in the center of the        */
/* buffer. This point is pointed to by the offset into the buffer       */
/* BUFF_CENTER.                                                         */
void DoPud(void)
{
        int i;
        int x1, x2, y1, y2, XSpeed, YSpeed, PenSpeed, SpeedAdjust;
        /* AmplitudeBaseline is our best guess as of what the amplitude is */
        /* when the pen is all the way down on the board.                  */
        int AmplitudeBaseLine;
switch(PudState)
{
        case PenUp:
                /* If we are looking for the pen to come down we will use  */
                /* the amplitude data that comes after our point under test. */
                AmplitudeBaseline = 0;
                for(i = BUFF_CENTER + 1; 1 != BUFF_SIZE; i++)
                        if(AmpBuff[i] > AmplitudeBaseline)
                                AmplitudeBaseline = AmpBuff[i];

/* Check our point under test against the baseline amplitude */
                /* If the Amplitude is high enough change state to PenDown   */
                /* and sent the point to the ProtocalHandler.                */
                if(AmpBuff[BUFF_CENTER] > AmplitudeBaseline - PEN_UP_THRESHOLD)
                {
                        PudState = PenDown;
                        ProtocolHandler(XBuff[BUFF_CENTER], YBuff[BUFF_CENTER],
                                ColorBuff[BUFF_CENTER]);
                }
                break;

case PenDown:
                /* If we are looking for the pen to come up we will use    */
                /* the amplitude data that comes before our point under test. */
                x1 = XBuff[BUFF_CENTER - 1];
                x2 = XBuff[BUFF_CENTER];
                y1 = YBuff[BUFF_CENTER - 1];
                y2 = YBuff[BUFF_CENTER];
                /* We will appropriate the speed of the pen as the sum of  */
                /* speed in the x direction and the speed in the y. This   */
                /* is not exact but computes fast and is close enough for  */
                /* our needs here.                                         */
                XSpeed = x2 - x1;
                if(XSpeed < 0)
                        XSpeed = x1 - x2;
                YSpeed = y2 - y1;
                if(YSpeed < 0)
                        YSpeed = y1 - y2;
                PenSpeed = XSpeed + YSpeed;

AmplitudeBaseline = 0;
                for(i = 0; i != BUFF_CENTER - 1; i++)
                        if(AmpBuff[i] > AmplitudeBaseline)
                                AmplitudeBaseline = AmpBuff[i];
                /* We will adjust the pen up threshold down if the pen is  */
                /* moving fast enough. This will compensate for amplitude  */
                /* variations do to the pens motion along the board at high */
                /* speed.                                                  */
```

```
                if(PenSpeed > 20)
                        SpeedAdjust = PenSpeed - 20;
                else
                        SpeedAdjust = 0;
                if(AmpBuff[BUFF_CENTER] <
                        AmplitudeBaseline - PEN_UP_THRESHOLD - SpeedAdjust)
                        {
                        HandlePenUp();
                        PudState = LookingForMin;
                        }
                else
                        {
                        ProtocalHandler(XBuff[BUFF_CENTER], YBuff[BUFF_CENTER],
                                ColorBuff[BUFF_CENTER]);
                        }
                break;

case LookingForMin:
                /* We will what for the amplitude to start up again before    */
                /* Looking for the pen to come down.                          */
                if(AmpBuff[BUFF_CENTER] > AmpBuff[BUFF_CENTER - 1])
                        PudState = PenUp;
                break;
        }
}

*                               ONEPOINT.C                                    */

/* Handle getting one x y point */
#include "all.h"
/*---------------------------------------------------------------------------*/
/*                              OnePoint                                     */
/*---------------------------------------------------------------------------*/
int OnePoint(void)
{
        int temp1, temp2;
        int 1;
        FLOAT16 fPenSize;
        StartTime(Time_SetGain);
        /* If the pen was found by the left scanner adjust the gain on the   */
        /* left amplifier as needed to keep the amplitude in range.          */
        if(LeftFound)
                {
                /* If the left amplitude is 63 it is against the rails and   */
                /* needs to be lowered.                                      */
                if(LeftAmp == 63)
                        {
                        LeftDataGain = ((LeftDataGain - LeftGainOff) >> 2) + LeftGainOff;
                        }
                /* Adjust the gain in an attempt to have the left amplitude at */
                /* The Target amplitude.                                     */
                else
                        {
                        temp1 = (TargetAmp - LeftZero)*(LeftDataGain - LeftGainOff);
                        temp2 = LeftAmp - LeftZero;
                        if(temp2 > 0)
                                LeftDataGain = IDiv(temp1, temp2) + LeftGainOff;
                        else
                                LeftDataGain = GAIN_LIMIT;

if(LeftDataGain > GAIN_LIMIT)
                                LeftDataGain = GAIN_LIMIT;
                        }
                }
/* If we did not find the pen with the left scanner set its gain              */
/* the the SEARCH_GAIN level.                                                 */
        else
                {
                LeftDataGain = SEARCH_GAIN;
                }
/* Adjust of left amplifier's offset for any gain change we may               */
/* have done.                                                                 */
```

```
LeftDataOffset = ((LeftA * LeftDataGain) >> 8) + LeftB;
SetDac(LEFT_SIDE, DATA_GAIN, LeftDataGain);
SetDac(LEFT_SIDE, DATA_OFFSET, LeftDataOffset);

switch(ScanState)
{
        case LOOK_FOR_PEN_HIGH_GAIN:
            RightDataGain = SEARCH_GAIN;
            break;

case WAIT_FOR_ZERO:
        case LOOK_FOR_PEN_FIXED_GAIN:
            break;
        case AGC_ON:
            /* If we are in AGC mode adjust the right scanners gain in    */
            /* the same fashion that we did for the left scanner.         */
            if(RightAmp == 63)
            {
                    RightDataGain = ((RightDataGain - RightGainOff) >> 1) +
                      RightGainOff;
            }
            else
            {
                    temp1 = (TargetAmp - RightZero)*(RightDataGain - RightGainOff);
                    temp2 = RightAmp - RightZero;
                    if(temp2 > 0)
                            RightDataGain = IDiv(temp1, temp2) + RightGainOfff;
                    else RightDataGain = GAIN_LIMIT;
            }
            if(RightDataGain > 255)
                    RightDataGain = 255;
            break;

case WRITING:
            /* If we are in WRITING mode adjust the gain slowly so        */
            /* that we will not trip the pen up down part of the          */
            /* program with repeated amplitude changes.                   */
            if(RightAmp == 63)
                    if(RightDataGain < 50)
                            RightDataGain--;
                    else
                            RightDataGain -= 2;
            if(RightAmp < 40)
            {
                    RightDataGain++;
                    if(RightDataGain > 255)
                            RightDataGain = 255;
            }
            break;

case WAITING_TO_WRITE:
            break;
}
RightDataOffset = ((RightA * RightDataGain) >> 8) + RightB;
SetDac(RIGHT_SIDE, DATA_GAIN, RightDataGain);
SetDac(RIGHT_SIDE, DATA_OFFSET, RightDataOffset);

/* Get scan data from the left and right scanners.                        */
GetLeftDataWithSync();
GetRightDataWithSync();

/* Do we need to respond to an interrupt?                                 */
if(IntFlag)
      return 0;

/* Try finding the pen in the left scanner data.                          */
LeftIntAngle = FindPen1(LEFT_SIDE);
if(LeftIntAngle == -1)
{
      Found = 0;
      LeftFound = 0;
      return 0;
```

```
}
else
        LeftFound = 1;

/* Find the amplitude for the left scanner                                  */
LeftAmp = 0;
LeftZero = 63;
for(i = 0; i != LeftPenN; i++)
{
        if(LeftPenData[i] > LeftAmp)
                LeftAmp = LeftPenData[i];
        if(LeftPenData[i] < LeftZero)
                LeftZero = LeftPenData[i];

}
fPenSize = Int2Float(PenSize);

/* Try finding the pen in the right scanner data.                           */
RightIntAngle = FindPen1(RIGHT_SIDE);
if(RightIntAngle == -1)
{
        Found = 0;
        return 0;
}

/* Find the amplitude for the right scanner                                 */
RightAmp = 0;
RightZero = 63;
for(i = 0; i != RightPenN; i++)
{
        if(RightPenData[i] > RightAmp)
                RightAmp = RightPenData[i];
        if(RightPenData[i] < RightZero)
                RightZero = RightPenData[i];
}

/* Are the left and right amplitudes high enough to have found the          */
/* pen.                                                                     */
if(LeftAmp - LeftZero > 10 && RightAmp - RightZero > 10)
{
        GetXY(LeftIntAngle, RightIntAngle, &XPos, &YPos);
        Found = 1;
        return 1;
}
Found = 0;
return 0;
}
```

Figure 5A:
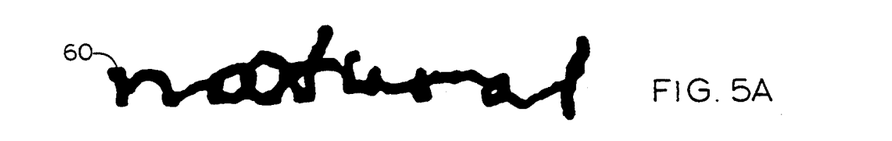
FIGS. 5A and 5B illustrate digitally reproduced images of the written word "natural," first without, and then with the pen-up/pen-down discriminator of the present invention.

The words shown in FIGS. 5 and 6 demonstrate application of the present invention to eliminate unwanted tracers between letters by showing digitally reproduced images from handwritten words, first without, then with pen-up/pen-down processing.

Figure 5B:
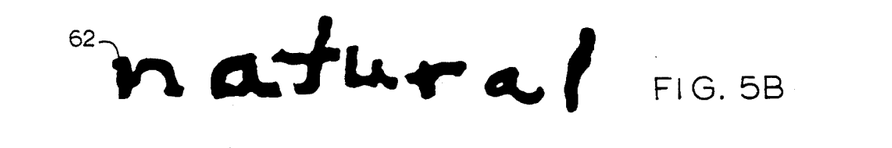
Figure 6A:
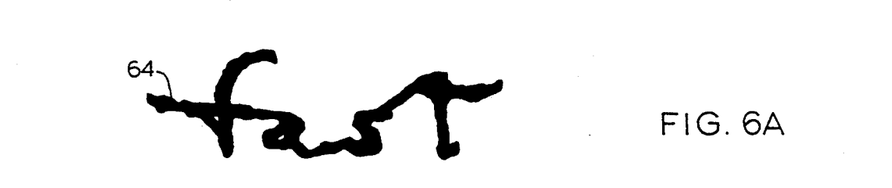
FIGS. 6A and 6B illustrate digitally reproduced images of the written word "fast," first without, and then with the pen-up/pen-down discriminator of the present invention.
Figure 6B:
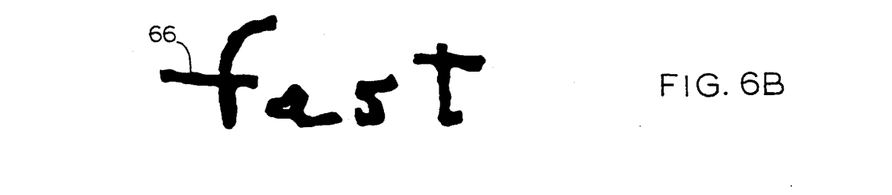

In FIG. 5, the word natural is digitally reproduced from a handwritten image in which the pen was lifted away from the writing surface between each of the letters. FIG. 5B was generated from the same digital record, however, with the addition of pen-up/pen-down processing. In FIG. 6, the operator printed the word "fast" in discrete letters. FIG. 6A shows that, without pen-up/pen-down processing which was used to generate FIG. 6B, all of the letters appear to be connected which is an inaccurate reproduction of the handwritten image.

Figure 7:
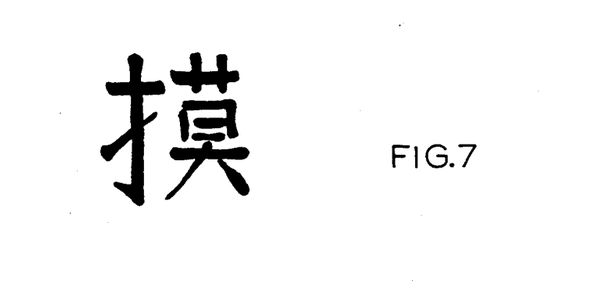
FIG. 7 illustrates a Chinese character, the creation of which requires numerous pen-up/pen-down movements.

FIG. 7 shows an example of a Chinese character which includes approximately 13 separately drawn lines. One can imagine that if each of those lines were connected by tracers, the symbol would look completely different and would almost certainly become uninterpretable for its intended meaning. Accordingly, it is believed that the invention disclosed and claimed in this application has critical applicability for the purpose of accurately tracking and reproducing complex symbols or characters such as the ones shown in FIG. 7, which require a relatively high frequency of pen-up/pen-down events.

The preferred embodiments of the invention have been described in detail. However, numerous variations of the described systems may be practiced without departing from the general principals of the invention which are claimed below. For example, the Z axis monitoring system of the present invention may be used in a setting where the objective is to use a finger or another type of non-writing implement to effectively trace over another image which already exists. The present invention may also be used to determine the variation in pressure which is applied on the implement during the write mode. For example, employing the principals previously described in this application, a pen may be designed which will produce a digitized reproduction of a drawn line which is thicker or thinner depending on the degree of pressure applied on the tip of the pen. The pen is equipped with a spring mechanism so that a reflective surface moves in the Z direction according to the amount of pressure applied to the pen tip. Thus, the analog signal corresponding to changes in the Z axis location of the reflector is relatable to the amount of pressure applied to the tip of the pen, and to the desired line width.

It is desired to secure and claim by Letters Patent:

1. In a graphic data-acquisition system for tracking the position of an implement relative to a writing surface, a sub-system for distinguishing between a write mode and a non-write mode of the writing implement comprising electromagnetic-radiation-generating structure disposed adjacent the writing surface and operable to produce an expanse of radiation in a substantially planar zone near the writing surface, radiation-interactive structure associated with the implement and capable of interacting with the expanse to produce signals which vary depending on a relative distance between a writing tip on the implement and the writing surface, monitoring structure capable of detecting and converting the signals into an analog data stream, and a processor for receiving and processing the data stream to determine when the implement is in the write mode and when the implement is in the non-write mode.

2. The sub-system of claim 1 wherein the degree of interaction between the radiation-generating structure and the radiation-interactive structure is infinitely varying as the implement moves from the write mode to the non-write mode.

3. The sub-system of claim 1 wherein the expanse has a depth, the radiation-interacting structure partially penetrates the expanse when the implement is in the write mode and a change in the degree of implement penetration into the expanse results when the implement moves between the write mode and the non-write mode.

4. The sub-system of claim 1 wherein the radiation-interacting structure is tapered so that the degree of interaction between the radiation-interacting structure and the expanse is infinitely varying as the implement moves between the write mode and non-write mode.

5. The sub-system of claim 1 wherein the expanse produced by the radiation-generating structure derives from a scanning electromagnetic beam.

6. The sub-system of claim 1 wherein the beam is a laser.

7. The sub-system of claim 1 wherein the radiation-interacting structure is reflective.

8. The sub-system of claim 1 wherein the radiation-interacting structure is non-reflective.

9. The sub-system of claim 1 wherein the radiation-interacting structure is variably reflective in a pen-up/pen-down direction generally perpendicular to the writing surface when the implement is in the write mode.

10. The sub-system of claim 8 wherein the radiation-interacting structure is uniformally reflective and geometrically tapered in the pen-up/pen-down direction.

11. The sub-system of claim 8 wherein the radiation-interacting structure is geometrically uniform and reflectively varying in the pen-up/pen-down direction.

12. In a graphic data-acquisition system for tracking the position of a writing implement relative to a writing surface by producing and interpreting an analog data stream from interaction between an expanse of electromagnetic radiation and the writing implement, a method of determining when the implement is in a write mode and when the implement is in a non-write mode comprising connecting a radiation-interactive structure to the implement so that the structure interacts with the expanse when the implement is in the write mode, producing an analog signal from varying interaction between the structure and the expanse as the implement is moved in a pen-up/pen-down direction generally perpendicular to the writing surface, and interpreting the signal to determine when the implement moves between the write mode and non-write mode.

13. The method of claim 12 further comprising establishing a baseline amplitude from the analog signal in a moving window of time while the implement is in the write mode, setting an amplitude threshold a fixed magnitude away from the baseline, determining non-write mode status of the implement when the amplitude of the analog signal falls outside the area between the baseline and the threshold.

* * * * *